April 10, 1951  A. E. MATHEY  2,548,734
INSERTABLE VENT PIPE
Filed Nov. 5, 1947  3 Sheets-Sheet 1
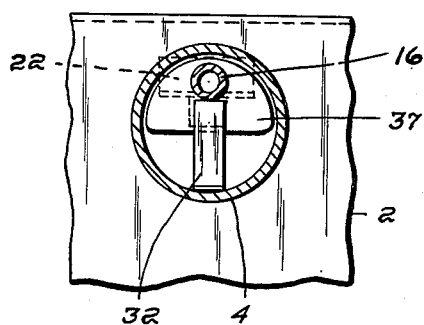
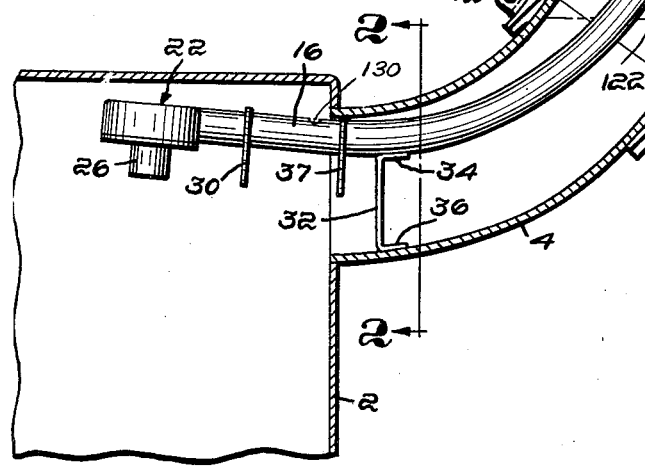
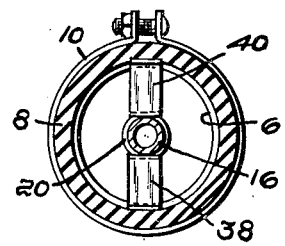
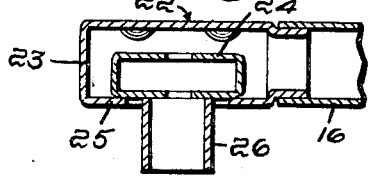
Inventor:
A. Edward Mathey,
by Chadley Chittick
Attorney

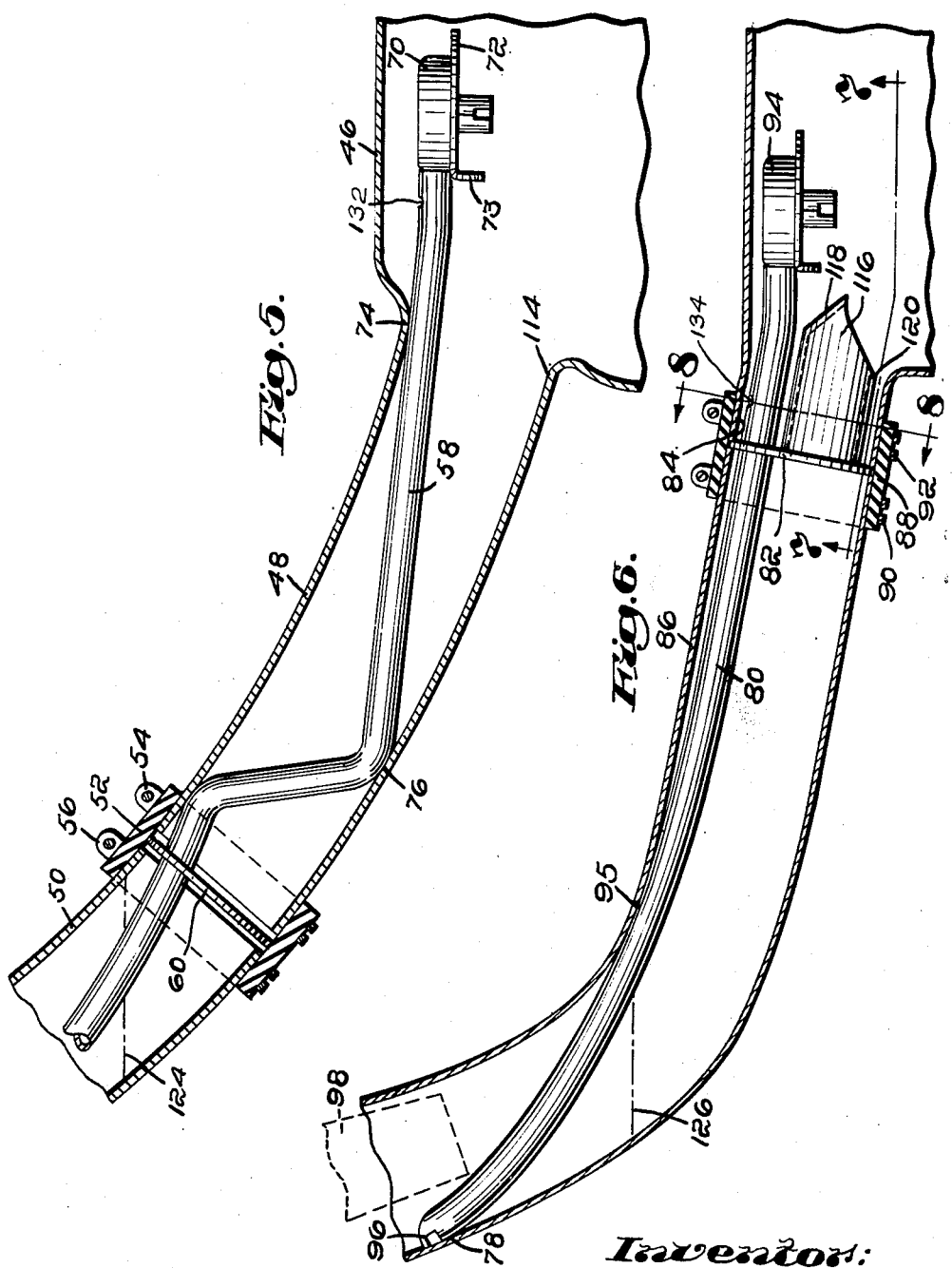

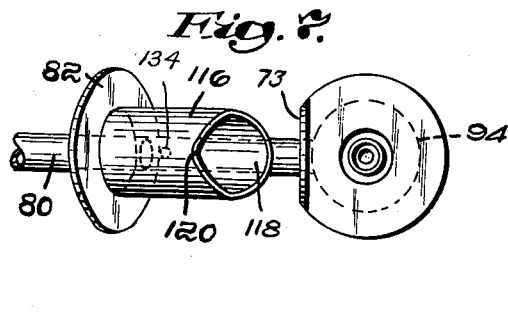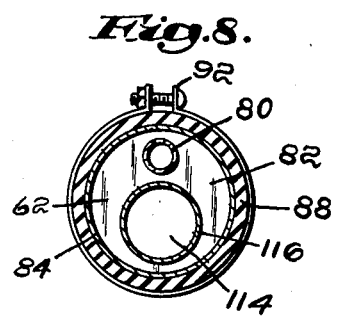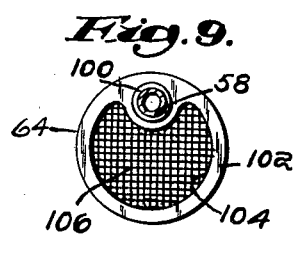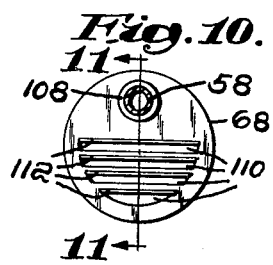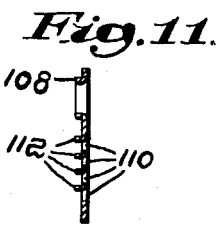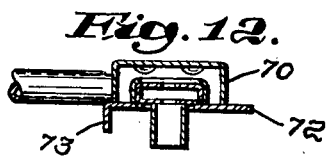

Patented Apr. 10, 1951

2,548,734

UNITED STATES PATENT OFFICE 2,548,734

INSERTABLE VENT PIPE

Alcide Edward Mathey, Allston, Mass., assignor to Scully Signal Company, East Cambridge, Mass., a corporation of Massachusetts Application November 5, 1947, Serial No. 784,122

10 Claims. (Cl. 220—86)

This invention relates to the problem of filling a tank with liquid. While the invention is of general application, it has particular relation to the filling of automobile gasoline tanks.

This application is a continuation in part of the application of Alcide Edward Mathey, Serial No. 741,079, filed April 12 1947, for Insertable Vent Pipe for Gasoline Tanks, which application has been abandoned.

For many years past it has been a common practice in the automobile industry to have the gasoline tank fill pipe also serve as the vent pipe through which the displaced gas may escape. In such installations it has been the intention of the automobile manufacturers to provide a fill pipe of sufficient internal diameter so that entering liquid will not completely block the pipe to permit displaced gas to escape simultaneously. However, it has often happened that the fill pipe has been made too small or too tortuous in relation to the maximum rate of filling provided by the average power operated gasoline pump. As a result, the fill pipe will oftentimes have its entire internal cross section blocked by entering gasoline, thereby temporarily preventing the escape of the displaced gas. As a result, the gas pressure in the tank gradually builds up until it becomes sufficient to drive the entering liquid back. This causes what is usually called a blowback, resulting in substantial waste of gasoline and creating a serious fire hazard.

The principal object of this invention is, therefore, to provide venting means located in the fill pipe whereby gas displaced by entering liquid will at all times be free to flow unimpeded from the tank to the atmosphere without materially limiting the capacity of the fill pipe. The invention contemplates the provision of an auxiliary unit which may be readily installed in the fill pipe and tank of existing automobiles.

The present invention is designed for use with those fill pipes which lead to the tank at or near the top. It is not suitable for use with so-called deep-fill tanks in which the fill pipe terminates within the tank close to the bottom.

The typical gasoline tank having the fill pipe connection at or near the top usually has leading therefrom a section which is in turn connected to the upper part of the fill pipe by a rubber hose connection clamped thereon in the usual manner. The invention therefore further contemplates a construction which will make it possible to install the venting device in pipes that have curved sections near the tank. Furthermore, the invention provides that the inner end of the vent pipe will be located in a position where entering gasoline cannot reach it, so that there will be practically no chance of stray gasoline being blown out through the vent pipe along with escaping gas.

In the installation of the present auxiliary device, it is obviously desirable that there be some means for indicating to the installer when the inner end of the vent pipe has reached its proper place. Accordingly, for each type of automobile with which the unit may be used, means is provided which will cause accurate and automatic location of the unit in the pipe so that it will operate in the most effective manner.

These and other objects of the invention will become more apparent as the description proceeds with the aid of the accompanying drawings, in which:

Fig. 1 is a vertical sectional view of an upper corner of a gasoline tank and fill pipe, with one form of the auxiliary vent pipe in installed position.

Fig. 2 is a section on the line 2—2 of Fig. 1.

Fig. 3 is a section on the line 3—3 of Fig. 1.

Fig. 4 is a vertical cross-section of a typical whistle and whistle housing adapted for use with the present invention.

Fig. 5 is another form of the invention, showing an alternative construction for holding the insertable vent pipe in position with respect to the tank and reducing the effective cross-sectional area.

Fig. 6 is still another type of construction adapted for use with a different form of tank construction.

Fig. 7 is a section on the line 7—7 of Fig. 6.

Fig. 8 is a section on the line 8—8 of Fig. 6.

Fig. 9 shows another type of supporting disc adapted for use with the present invention.

Fig. 10 is still another form of supporting disc.

Fig. 11 is a sectional elevation on the line 11—11 of Fig. 10.

Fig. 12 is a vertical sectional view of a whistle adapted for use with the present invention, which differs slightly from the whistle shown in Fig. 4.

Referring first to Figs. 1-4, the gasoline tank 2 has a fill pipe connection 4 leading from the upper part of the tank close to the top. Pipe 4 in the present instance curves upwardly and is connected to the upper portion 6 of the fill pipe by a rubber hose connection 8. The hose connection is maintained in secure relationship with pipes 4 and 6 by the usual hose clamps 10 and 12.

The upper portion of the pipe 6 will vary in length according to the particular installation, and in the present instance is shown broken away in part to indicate its indeterminate length.

In the normal filling of a tank through a fill pipe of the type shown, the entering liquid, if supplied at standard filling rates, will generally fill the entire cross-sectional area at some point in the length of the fill pipe. Such blocking will most likely take place at the curved section. To obviate the blow-back effect it is necessary to provide for free escape of the displaced gas. This is accomplished in the present invention by the use of the special vent pipe indicated generally at 14. The vent pipe comprises a lower portion or section 16 and an upper portion or section 18 connected by a short coupling 20 which holds the two parts in sufficiently secure engagement. While the present disclosure shows the vent pipe formed from two connected pieces, nevertheless, it will be understood that the vent pipe may be a single continuous tube if the fill pipe is of such configuration or construction as to permit the introduction of a one-piece vent pipe. Where the two-part construction is used it makes it possible for certain installations to be made which could not be accomplished if the vent pipe were a single piece.

The inner end of section 16 has affixed thereto a signaling whistle unit 22 of the type that is now well known in the automotive art. This unit consists of a housing 23, a button whistle 24 resting on the seat 25, and an intrusion tube 26 that extends downwardly through the seat opening.

The housing of whistle unit 22 connects with the end of section 16 in such manner that gas entering the depending intrusion tube 26 of the whistle 24 may flow freely through the whistle and the housing into section 16, thence through coupling 20 on into the upper section 18, from whence it passes to the atmosphere through side ports 27. The upper end of section 18 is closed at 28, so that when the filling nozzle is inserted in pipe 6 there will be no possibility of liquid flowing down vent pipe 14.

Near the inner end of section 16 is a baffle 30 which acts to prevent the in-rushing liquid from flowing any further along pipe 16 toward intrusion tube 26. Thus displaced gas may flow freely from the tank without carrying any of the entering liquid with it.

Since it is desirable that whistle unit 22 and the lower end of intrusion tube 26 be maintained at as high a level as possible, so that the tank may be substantially filled before any liquid enters the vent pipe, there has been provided means for supporting section 16 in a position against the top of pipe 4 which will bring whistle unit 22 close to the top of the tank. This supporting means is in the form of a leg 32 which is soldered or otherwise affixed to the bottom of section 16 at 34, and which terminates in a flat shoe 36 to facilitate its movement along the interior of pipe 4.

Since the installation of a vent pipe of the present type immediately relieves the tendency for back pressure to build up in the tank, the liquid entering through the fill pipe flows much more freely, as it does not have to contend with displaced gas escaping through the vent pipe.

Accordingly, in order that the signal may function properly, it is necessary to insure that the entering liquid at some place along the length of the fill pipe completely block the latter, so that all displaced gas will be compelled to flow to the atmosphere through the vent pipe.

To achieve this result there is attached to the vent pipe a second baffle 37 located within the fill pipe. The general shape of this baffle may be approximately that of baffle 30, thereby substantially reducing the effective cross-sectional area of the fill pipe at that point. The liquid as it passes this baffle will completely fill the remaining available cross-sectional area, so that there is no chance for the displaced gas to make its escape through the fill pipe under the pressure conditions prevailing. The gas passes to the atmosphere through the vent pipe.

In order that an installation of this sort may be made, it is necessary to disconnect section 6 from the hose coupling 8. The lower section 16 of the vent pipe will likewise be separated from the upper section 18. This makes it possible to feed the lower end of section 16 down through coupling 8 and pipe 4 until it reaches the position shown. Means for locating section 16 so that whistle 22 will be a suitable distance inside the tank is provided by a pair of spring prongs 38 and 40 soldered or otherwise secured on opposite sides of section 16 at the positions shown. Prongs 38 and 40 are sprung inwardly by hand to enable them to be inserted within hose coupling 8, where, upon release, they will remain secure against any further inward movement. In this manner the inner end of section 16 can be positively located at the required point.

After the inner section 16 has been located in the manner described, section 6 of the fill pipe is reinstalled within coupling 8, and the upper section 18 of the vent pipe is fed down and into the upper end of coupling 20, where it is frictionally maintained against displacement in normal use. If the vent pipe is one piece, the upper end will assume its proper position within the confines of section 6 of the fill pipe when the latter is reconnected to coupling 8.

The operation of the construction heretofore described is as follows:

A filling nozzle, indicated at 42, leading from the liquid supply, is placed within the upper end of section 6 of the fill pipe with its end preferably below the side ports 27. The liquid supply is then turned on and the liquid runs freely into the tank through the fill pipe. The small cross-sectional area of the vent pipe and the prongs 38 and 40 and the leg 32 do not materially impede the inflowing liquid. Thus, filling will proceed normally, with the baffle 37 insuring that the fill pipe runs full at that section. Some liquid may flow along section 16 toward the inner end. This flow, if any, is effectively blocked by baffle 30, so that flow of displaced gas into intrusion tube 26 is unimpeded. Thus, any blow-backs through the fill pipe due to compressed gas in the upper part of the tank are completely eliminated, as the vent pipe 14 is of adequate capacity. Through the use of the signaling whistle unit 22 in combination with the auxiliary insertable vent pipe, the operator is at all times advised as to the progress of the filling. Until the liquid level reaches the lower end of instrusion tube 26, a steady whistling sound will be heard. As soon as the lower end of tube 26 is closed by the rising liquid, the whistle will immediately cease, and the operator will be advised that the tank is substantially full. Since the ordinary filling pump is controlled by a hand-gripped valve on the nozzle, it is possible to cut off instantly the supply of liquid upon the cessation of the whistle, so that possible overflow from continued filling is eliminated.

It will be understood, of course, that in those cases where the fill pipe is straight or with little curvature, the vent pipe may be made in a single piece, as sectional installation will be unnecessary. Whether the fill pipe is curved or straight, it is customary to utilize a rubber hose coupling such as 8 between the tank and the upper end of the fill pipe for the purpose of minimizing vibration, facilitating assembly, and reducing the number of tank models. Thus the locating prongs 38 and 40 will act in the manner disclosed whether they have been placed directly in coupling 8 as described above or have been fed down through the upper portion 6 of the fill pipe to expand into the coupling.

Modified forms of the invention are disclosed in Figs. 5 and 6. In both of these cases the vent pipes are made in a single piece and are supported and maintained in position principally by means of a transverse supporting plate, preferably in the form of a disc which is held in position by the hose connection or by the adjacent ends of the fill pipe, which, assisted by the hose connection, may be positioned to abut against the sides of the supporting disc to hold the latter firmly in position. These parts together, with or without a whistle, may be considered as a venting unit.

Referring to Fig. 5, the tank 46 has a short fill pipe section 48 extending therefrom which is connected to the upper section 50 by means of the usual hose connection 52 and clamps 54 and 56.

The vent pipe 58 is rigidly connected to and supported by a supporting disc 60, which, by way of example, may take the form of any one of the three supporting discs 62, 64 or 68 shown in Figs. 8, 9 and 10. However, it is to be understood that the invention is not to be limited to the use of these particular types of supporting discs. They are merely representative of a general class of supports having particular characteristics which will be referred to hereinafter. The supporting discs combine the functions of fingers 38 and 40 and baffle 37 shown in Fig. 1.

The inner end of vent pipe 58 has rigidly affixed thereto a whistle 70 generally similar to whistle 22 already described. In order to lend rigidity to the unit there is an annular flange 72 which extends circumferentially thereabout, being bent down on the vent pipe side as at 73. This vertical portion acts as a baffle to check effectively the flow of any entering liquid along the under side of the vent pipe before reaching the entrance to the whistle and vent tube.

Supporting disc 60 is of a diameter substantially equal to the outside diameters of fill pipes 48 and 50. Thus, when the fill pipe sections have been disconnected, a supporting disc 60 may be placed against the end of fill pipe section 48 with the end of section 50 positioned against the other side of the supporting disc. All parts may then be firmly clamped in position by hose connection 52.

While supporting disc 60 is adequate to maintain whistle 70 in its proper position within and close to the tank top, nevertheless it is desirable to insure against possible vibration. Accordingly, the vent pipe 58 has been bent, as shown, so that there are several points of contact. One point of contact between the tank and vent pipe is at 74, another at 76, and a third at the point where the upper end of the vent pipe and fill pipe engage, as at the corresponding position 78 shown in Fig. 6.

The construction of the supporting disc 60 is of importance, as it serves not only to support the vent pipe 58 but also to provide the necessary baffling to insure that the fill pipe runs full at that section, thus causing all of the displaced gas to flow to the atmosphere through whistle 70 and vent pipe 58.

Another form of the invention is shown in Fig. 6. In this construction the vent pipe, which is numbered 80, has a much straighter run than that shown in Fig. 5. Supporting disc 82 is located much closer to the tank, as in this case the tank side section of the fill pipe is relatively short, as indicated at 84, while the outer section of the fill pipe 86 is correspondingly longer. As in Fig. 5, supporting disc 82 is mounted between the ends of fill pipe sections 84 and 86, where the parts are held firmly in position by hose connection 88 secured by clamps 90 and 92. Whistle 94 is of the same general construction as whistles 70 and 22 heretofore described.

Undue vibration of vent pipe 80 within the fill pipe is prevented by so shaping the vent pipe that it comes into engagement with fill pipe section 86 at 95 and at its upper end at 78. The outer end of vent pipe 80 is cut away on its under side and the extending portion is bent down as at 96 to provide a covering flap over the end of the vent pipe to minimize the likelihood of any liquid from the filling nozzle 98 getting into the vent pipe.

As in the construction of Figs. 1–4 in which baffle 37 serves the purpose of causing the fill pipe to run full so that displaced gas cannot escape through the fill pipe but must flow to the atmosphere through the whistle and vent pipe, so do the supporting discs shown in varying forms in Figs. 8, 9 and 10 fill the same purpose.

The constructions shown in Figs. 9 and 10 are adapted to be used to support vent pipes 58 or 80 shown in Figs. 5 and 6, or, if deemed desirable, the construction shown in Fig. 8 may be used in the manner shown in Fig. 6.

Referring to Figs. 5 and 9, vent pipe 58 passes through opening 100, where it is rigidly secured. The surrounding rim 102 outlines a major aperture 104, which may be left open or preferably partially closed by wire mesh 106. This arrangement causes entering liquid which, during its travel down fill pipe 50 does not completely fill the pipe, to fill completely the somewhat reduced cross-sectional area provided by disc 64, thus blocking at this point any possible escape of displaced gas through the fill pipe.

Another form of supporting disc 68 shown in Fig. 10 has vent pipe 58 passing through circular opening 108 wherein it is rigidly secured by soldering or otherwise. In the lower half of the disc are a plurality of louvers 110 formed by punching transversely extending slots in the disc and bending the material somewhat horizontally, as shown at 112 in Fig. 11. These flanges are on the tank side of the supporting disc and serve to smooth out the liquid as it flows from the disc to the tank. This is very advantageous, as it results in a quiet non-splashing type of stream that passes over the inner edge 114 of the fill pipe. Elimination of splashing lowers evaporation loss and substantially prevents any chance of scattered liquid passing into the whistle and vent pipe. As the cross-sectional area of the liquid leaving the disc or baffle is less than the cross-sectional of the pipe below the baffle, it is clear that the upper part of the fill pipe below the baffle will contain no liquid, but, on the contrary, will constitute a gaseous passageway above the surface of the smooth flowing liquid.

The supporting disc shown in Fig. 8 is that used in the construction of Fig. 6. The large lower opening 114 through which the entering liquid passes in a solid stream to cause the fill pipe to run full at that section has secured thereto a tubular extension 116, which, as shown in Fig. 6, has a downwardly turned outer end 118 and a shortened lower side at 120. This construction causes the liquid flowing through pipe 116 to be directed downwardly into the tank to avoid completely any interference or engagement with whistle 94.

By this arrangement, displaced gas is prevented from reaching the atmosphere through the fill pipe, and at the same time no liquid can mingle with the gas passing out through whistle 94 and vent pipe 80. As a result, spitting is eliminated.

In all of the several constructions disclosed in the present application, it is obviously necessary, if the whistle is to function during filling, that the tank pressure exceed atmospheric pressure. Since the various baffle constructions all serve the purpose of causing the fill pipe to run full at and somewhat above the baffle position, it follows that the whistle and vent pipe must be of adequate capacity to vent whatever gas is displaced during maximum rates of filling without developing a pressure sufficient to blow back through the fill pipe. The typical service station gasoline pump currently delivers approximately 15 gallons per minute maximum. The size of the opening through the fill pipe at the baffle position must therefore be large enough to permit at least 15 gallons per minute to flow therepast against zero back pressure, so that entering liquid will not back up the fill pipe and overflow and at the same time small enough to insure filling the fill pipe at lesser rates of filling.

It will be recognized that there is never zero back pressure in the tank during filling, as there must be a positive pressure present to force the displaced gas through the vent pipe or whistle and vent pipe to the atmosphere. The type of whistle used in this construction operates satisfactorily on very low pressures, which may be between one-half and two ounces. As a result, the whistle will sound during filling, regardless of the filling rate. That is to say, the gasoline pump might deliver gasoline at a rate between seven and 15 gallons per minute and the whistle would sound over that entire range.

Since the fill pipe runs full at the baffle position, it follows that as pressure develops in the tank there must be a corresponding head of liquid above the baffle. Such head is indicated at 122 in Fig. 1, 124 in Fig. 5, and 126 in Fig. 6. The faster the rate of filling, the higher the head.

At the maximum rate of filling the back pressure that will develop because of the size of the whistle and vent pipe passages will be in the order of two ounces per square inch. This is equal to a head above the baffle of approximately four inches of liquid, depending, of course, upon the specific gravity of the type of liquid entering the tank. Because of these facts, the entering liquid will back up a vertical distance which is the resultant of the combined effects of the size of the baffle apertures and the pressure developed in the tank during filling. In other words, considering the maximum rate of fill to be achieved, the baffle apertures are of such size in relation to the venting system that the head in the fill pipe above the baffle created by flow through these apertures superimposed on the head created by the tank pressure developed by the controlled venting system can never exceed the vertical distance available above the baffle and the spill point of the fill pipe.

From the description of the several species disclosed herein, it will be seen that the invention comprises a unitary structure adapted to be positioned in the fill pipes of gasoline tanks of present-day automobiles. The invention includes means for rigidly maintaining the insertable vent pipe in proper position within the fill pipe, with the inner end of the vent pipe located where it may be freely accessible to displaced vapors as the filling proceeds. The structure also includes means for reducing the effective cross-sectional area of the vent pipe at a suitable location, so that the fill pipe will run full at that point and for a distance thereabove depending on the rate of fill to prevent any escape of gas through the fill pipe, thus insuring that the gas will pass to the atmosphere through the vent pipe and cause the whistle to sound during filling.

The whistle construction disclosed herein provides for bypassing part of the displaced gas about the whistle. This bypassing occurs whenever the tank pressure exceeds the pressure required to raise the whistle body from its seat. Under such conditions, part of the gas flows to the vent pipe through the whistle and the remainder through the bypass about the whistle. This arrangement is desirable, as it not only eliminates any possibility of the whistle overblowing, which could occur if all of the displaced gas had to pass through the whistle orifice, but also limits the pressure that can develop in the tank under normal filling rates. The combined capacity through the whistle and the bypass is about equal to that of the vent pipe.

In each form disclosed the whistle has been positioned on the inner end of the vent pipe, but it is to be understood that it could be located any place throughout the length of the vent pipe. However, the position at the inner end is preferable, as the particular whistle form disclosed is believed the most satisfactory type for use in this situation.

While the preferred form of the invention contemplates the use of a whistle of the type shown, which includes the bypass operable when the pressure exceeds a predetermined degree, still it will be appreciated that any other type of vapor operated audible signalling device now known to the art could be used and still be within the scope of the invention. The disclosed type of whistle provides much greater scope in operation, in that it gives a proper signal over a much wider range of filling rates.

The constructions of the supporting discs shown in Figs. 9 and 10 provide the further advantage of acting to prevent the theft of gasoline from the tank. The siphoning of gasoline from unguarded automobiles is unfortunately a somewhat widespread practice. When the present unit utilizing a supporting disc of the construction shown in Fig. 9 or 10 is in position in the fill pipe, the insertion of a siphon tube into the tank is impossible.

In the construction of the supporting discs 64 and 68 the mesh openings in disc 64 and the louver openings in disc 68 will be of such size as to preclude the insertion of any tube which could be effectively used for siphoning. In practice, mesh openings or louver openings small enough to stop the passage of tubes one-quarter inch or greater in diameter will be adequate to eliminate the siphoning hazard.

The preferred form of the invention will ordinarily include a signaling device or whistle which will be positioned within the tank close to the fill pipe level so that the signal will be given when the tank is close to full. However, since the vent pipe construction serves primarily as means for venting the tank properly at all rates of fill, it will be understood that the construction as disclosed, but with the whistle eliminated, will still be within the scope of the invention. Furthermore, while the preferred form shows the lower end of the vent pipe extending into the tank so that the whistle on the end thereof may be placed in a position close to the tank top, still it will be understood that the vent pipe with or without the whistle might terminate and be positioned at or below the baffle without departing from the spirit of the invention. This is so because a whistle in such position would be at or above the full liquid level position, and would be located where it would be reached by the rising liquid level with substantially the same effect as when positioned within the tank as shown.

Occasionally an operator may fail to shut off the incoming liquid promptly after the signal is given. In such case the rising liquid might completely trap not only the lower end of the vent pipe but also the fill pipe in those cases where the uppermost opening through the supporting disc, such as 62, 64 and 68, is lower than the tank top. Such a situation is shown in Fig. 6. It is therefore desirable to provide for escape of any remaining compressed gas trapped in the top of the tank.

To this end, a small hole has been provided in the top side of each of the vent pipes disclosed, as indicated at 130 in Fig. 1, at 132 in Fig. 5, and at 134 in Fig. 6. Each of these holes is located at a point where further venting can take place after the vent tube has been trapped, and even after the vent tube and fill pipe have both been trapped, as can occur in the construction of Fig. 6. Holes 130, 132 and 134 have the further advantage of acting as bypasses during normal filling, so that part of the displaced gas in each case will pass to the atmosphere through the small hole. However, the amount that is bypassed in this manner is not sufficient to affect materially the operation of the whistle over all normal rates of filling.

Holes 130, 132 and 134 also act to slow down or delay any blow back that might occur through the vent pipe after the whistle has been trapped. That is to say, immediately on trapping of the whistle, pressure commences to build up in the gas remaining in the tank until the supply is cut off. Were it not for the aforesaid small holes, the developing pressure would tend to drive some of the liquid up the vent pipe almost immediately. This is particularly true if there is any substantial delay in cutting off the liquid supply. By the inclusion of these small holes, which are located above the liquid level at the time of trapping, the development of pressure in the trapped gas is minimized, and, correspondingly, the blow back tendency after the vent pipe has been sealed off is minimized and delayed.

While the forms disclosed herein have been designed to operate with particular relation to ordinary automobile gasoline tanks and gasoline pumps of current design which deliver gasoline at any rate up to 15 gallons per minute, it will be understood by those familiar with this art that the size and capacity of the various elements may be varied at will to meet the filling rates that may be present in other situations. The invention is not to be limited to use with automobile gasoline tanks, but, on the contrary, is of broad application for use where filling conditions of this general type prevail.

I claim:

1. As an article of manufacture, an auxiliary venting unit adapted to be positioned in the fill pipe of a closed tank in which the fill pipe is of the conventional two-piece hose coupled type and leads into the tank close to the maximum level of fill, said venting unit comprising a vent pipe relatively small with respect to the fill pipe in which it is to be inserted, and shaped generally to fit in said fill pipe, a supporting member in the form of a transverse plate having an outside diameter greater than the inside diameter of said fill pipe whereby said supporting member may be positioned and secured between the ends of the two pieces of said fill pipe, said plate having one opening therethrough through which said vent pipe passes, and having another opening therethrough through which liquid may flow to reach said tank.

2. As an article of manufacture, an auxiliary venting unit adapted to be positioned in the fill pipe of a closed tank in which the fill pipe is of the conventional two-piece hose coupled type and leads into the tank close to the maximum level of fill, said venting unit comprising a vent pipe relatively small with respect to the fill pipe in which it is to be inserted, and shaped generally to fit within said fill pipe, a supporting member in the form of a transverse plate having an outside diameter greater than the inside diameter of said fill pipe whereby said supporting member may be positioned and secured between the ends of the two pieces of said fill pipe, said plate having one opening therethrough through which said vent pipe passes, and having another opening therethrough through which liquid may flow to reach said tank, and means associated with said other opening for causing the liquid to flow smoothly below said plate, the inner end of said vent pipe located at a position when said unit is secured in said fill pipe where displaced gas may enter said vent pipe without interference from said smoothly flowing liquid.

3. As an article of manufacture, an auxiliary venting unit adapted to be positioned in the fill pipe of a closed tank in which the fill pipe is of the conventional two-piece hose coupled type and leads into the tank close to the maximum level of fill, said venting unit comprising a vent pipe relatively small with respect to the fill pipe in which it is to be inserted, and shaped generally to fit in said fill pipe, a supporting member in the form of a transverse plate having an outside diameter greater than the inside diameter of said fill pipe whereby said supporting member may be positioned and secured between the ends of the two pieces of said fill pipe, said plate having one opening therethrough through which said vent pipe passes, and having another opening therethrough through which liquid may flow to reach said tank, the length of said vent pipe being such that its lower end terminates in a gaseous area were displaced gas may enter freely without interference from liquid passing to the tank below said plate.

4. The combination of a closed tank having a fill pipe in which the said fill pipe leads into the tank close to the maximum level of fill, said fill pipe comprising two parts connected by a yieldable connection to provide a space between the adjacent ends of said parts, said adjacent ends being a substantial distance from said tank, a transverse plate with an opening therethrough positioned with its periphery between said adjacent ends and in contact with said yieldable connection, a vent pipe supported by said plate having its outer end in a position with respect to the outer part of said fill pipe where it may vent to the atmosphere without interference from liquid that is fed to said fill pipe, the inner end of said vent pipe located in a gaseous area where displaced gas may enter said vent pipe without interference from said entering liquid that has passed said plate.

5. The combination of a closed tank having a fill pipe in which the said fill pipe leads into the tank close to the maximum level of fill, said fill pipe comprising two parts connected by a yieldable connection to provide a space between the adjacent ends of said two parts, said adjacent ends being a substantial distance from said tank, a transverse plate positioned with its periphery between said adjacent ends and in engagement with said yieldable connection, a vent pipe extending through said plate, another opening through said plate of less cross sectional area than said fill pipe through which liquid entering the tank may pass, means connected to said plate for smoothing the flow of liquid from said plate to said tank whereby there will be a gaseous area in the upper part of the fill pipe below said plate and continuous with the gaseous area of said tank, the inner end of said vent pipe located in the said gaseous area where it may be reached by gas displaced by said entering liquid without interference from said entering liquid.

6. An article of manufacture as set forth in claim 1, said transverse plate being in the form of a disc and having a relatively large hole therethrough through which entering liquid is adapted to flow and having a pipe extending from said hole in the direction of said tank whereby all liquid entering said tank must flow through said pipe.

7. An article of manufacture as set forth in claim 1, said transverse plate constituting a baffle which, when said vent pipe is in position within said fill pipe, will reduce the effective cross sectional area of said fill pipe sufficiently to cause said fill pipe to run full immediately above the location of said transverse plate at normal filling rates.

8. An article of manufacture as set forth in claim 1, said transverse plate constituting a baffle which, when said vent pipe is in position within said fill pipe, will reduce the effective cross sectional area of said fill pipe sufficiently to cause said fill pipe to run full immediately above the location of said transverse plate at normal filling rates, the opening through said transverse plate through which liquid flows during the filling of said tank being of such dimensions as to preclude the movement past said baffle of a tube having a diameter of one-quarter inch or greater.

9. An article of manufacture as set forth in claim 1, said vent pipe bent so that when it is in position in said fill pipe said supporting member and at least two points on said vent pipe spaced from said supporting member will come into firm contact with said fill pipe in such manner that said vent pipe will tend to be distorted after installation somewhat from its normal configuration prior to insertion in said fill pipe.

10. An article of manufacture as set forth in claim 1, said vent pipe bent so that when it is in position in said fill pipe said supporting member and at least two points on said vent pipe spaced from said supporting member will come into firm contact with said fill pipe in such manner that said vent pipe will tend to be distorted after installation somewhat from its normal configuration prior to insertion in said fill pipe, both the points of contact of said vent pipe with said fill pipe being above said supporting member.

ALCIDE EDWARD MATHEY.

REFERENCES CITED

The following references are of record in the file of this patent:

UNITED STATES PATENTS

| Number | Name | Date |
|---|---|---|
| Re. 21,930 | Scully et al. | Oct. 21, 1941 |
| Re. 22,833 | Sandusky | Jan. 21, 1947 |
| 1,079,836 | Canfield | Nov. 25, 1913 |
| 1,116,934 | Seltzer et al. | Nov. 10, 1914 |
| 1,217,732 | Fedders | Feb. 27, 1917 |
| 1,242,473 | Prentice | Oct. 9, 1917 |
| 1,876,627 | Davis et al. | Sept. 13, 1932 |
| 1,995,007 | Myers | Mar. 19, 1935 |
| 2,138,104 | Kellogg | Nov. 29, 1938 |
| 2,140,559 | Scully et al. | Dec. 20, 1938 |
| 2,281,448 | Mathey | Apr. 28, 1942 |
| 2,305,992 | Quillen | Dec. 22, 1942 |
| 2,320,162 | Zelnis | May 25, 1943 |

FOREIGN PATENTS

| Number | Country | Date |
|---|---|---|
| 505,384 | Great Britain | May 10, 1939 |